United States Patent
Ahuja

(10) Patent No.: US 11,444,832 B2
(45) Date of Patent: Sep. 13, 2022

(54) INTEGRATING PROXIES FROM THIRD PARTY LIBRARIES WITHIN AN INTEGRATION ENVIRONMENT

(71) Applicant: SAP SE, Walldorf (DE)

(72) Inventor: Sapreen Ahuja, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/147,668

(22) Filed: Jan. 13, 2021

(65) Prior Publication Data

US 2022/0150117 A1    May 12, 2022

(30) Foreign Application Priority Data

Nov. 11, 2020 (IN) .............................. 202011049171

(51) Int. Cl.
| | |
|---|---|
| *H04L 41/0816* | (2022.01) |
| *G06F 9/445* | (2018.01) |
| *G06F 16/27* | (2019.01) |
| *H04L 67/565* | (2022.01) |
| *H04L 69/08* | (2022.01) |

(52) U.S. Cl.
CPC ...... *H04L 41/0816* (2013.01); *G06F 9/44521* (2013.01); *G06F 16/27* (2019.01); *H04L 67/565* (2022.05); *H04L 69/08* (2013.01)

(58) Field of Classification Search
CPC . H04L 41/0816; H04L 67/2823; H04L 69/08; G06F 16/27; G06F 9/44521
USPC ......................................................... 709/220
See application file for complete search history.

(56) References Cited

U.S. PATENT DOCUMENTS

| | | |
|---|---|---|
| 7,072,934 B2 | 7/2006 | Helgeson et al. |
| 8,051,185 B2 | 11/2011 | Lee et al. |
| 8,495,724 B2 | 7/2013 | Devine et al. |

(Continued)

FOREIGN PATENT DOCUMENTS

WO        2005060202        6/2005

OTHER PUBLICATIONS

Help.Sap.com [online], "Configuring the Channel for ABAP Proxy Receivers" Oct. 2020, [retrieved on Oct. 15, 2020], retrieved from: URL <https://help.sap.com/viewer/3b236cedbe79480aa10d9f60524ea460/7.5.8/en-US/8578af1bf407434796aaf8dbd6d4e7b7.html>, 3 pages.

(Continued)

*Primary Examiner* — Zi Ye
(74) *Attorney, Agent, or Firm* — Fish & Richardson P.C.

(57) ABSTRACT

Integrating proxies within an integration environment can be implemented as a computer-implemented method. Deployment of integration content to integrate with a destination system having a destination system configuration is determined. The integration content has a destination configuration that is incompatible with the destination system configuration. In response to determining that the integration content has the destination configuration that is incompatible with the destination system configuration, the integration content is dynamically modified to integrate with a black box integration content having a black box source address and having a destination configuration as the destination system configuration. The modified integration content is integrated to the destination system through the generated black box integration content.

14 Claims, 4 Drawing Sheets

(56) References Cited

U.S. PATENT DOCUMENTS

| | | | |
|---|---|---|---|
| 9,778,966 B2 | 10/2017 | Ritter et al. | |
| 10,715,388 B2 | 7/2020 | Fildebrandt et al. | |
| 10,783,007 B2 | 9/2020 | Fildebrandt et al. | |
| 2003/0105887 A1* | 6/2003 | Cox | G06F 8/61 719/328 |
| 2006/0159077 A1* | 7/2006 | Vanecek, Jr. | G06F 8/30 370/360 |
| 2020/0394080 A1 | 12/2020 | Fildebrandt et al. | |

OTHER PUBLICATIONS

Li et al., "APPCOMMUNE: Automated Third-Party Libraries De-duplicating and Updating for Android Apps" SANER, Feb. 2019, 11 pages.

Oracle.com [online], "Integrating Third-Party Content Sources Using Proxy Assets" Jul. 2016, [retrieved on Oct. 29, 2020], retrieved from: URL <http://www.oracle.com/webapps/redirect/signon?nexturl=https://docs.oracle.com/middleware/12211/wcs/develop/GUID-3ADD7336-A7EA-472D-9F40-0C6E2FD6CB73.htm#WBCSD6337>, 37 pages.

Bellavista et al., "iPOJO-based middleware solutions for self-reconfiguration and self-optimization." KSII Transactions on Internet and Information Systems (TIIS) 5.8, Aug. 2011, 1368-1387, 20 pages.

Ibsen et al., "Camel in action" Simon and Schuster, 2018, 122 pages.

Strauch et al., "ESBMT: A multi-tenant aware enterprise service bus." International Journal of Next-Generation Computing 4.3, Nov. 2013, 230-249, 21 pages.

Strauch et al., "Transparent Access to Relational Databases in the Cloud using a Multi-tenant ESB." CLOSER, Apr. 2014, 10 pages.

Extended European Search Report issued in European Appln. No. 21191822.2 dated Feb. 14, 2022, 12 pages.

\* cited by examiner

INTEGRATING PROXIES FROM THIRD PARTY LIBRARIES WITHIN AN INTEGRATION ENVIRONMENT

CLAIM OF PRIORITY

This application claims priority under 35 USC § 119(e) to India Provisional Patent Application Ser. No. 202011049171, filed on Nov. 11, 2020, the entire contents of which are hereby incorporated by reference.

TECHNICAL FIELD

The present disclosure relates to computer-implemented methods, software and systems for integrating proxies, for example, custom and non-compatible proxies, from third party libraries within an integration environment.

BACKGROUND

In an enterprise, a collection of technologies and services forms a middleware framework to enable integration of systems and applications across the enterprise. Such integration involves interfacing existing integration content which expect some standard protocols, configurations or mechanisms to connect to a destination system. Certain network topologies or system constraints affect direct and standard connectivity to such destination systems.

SUMMARY

This disclosure describes integrating and consuming custom and non-compatible proxies from third party libraries within an integration environment.

Certain aspects of the subject matter described here can be implemented as a computer-implemented method. Deployment of integration content to integrate with a destination system having a destination system configuration is determined. The integration content has a destination configuration that is incompatible with the destination system configuration. In response to determining that the integration content has the destination configuration that is incompatible with the destination system configuration, the integration content is dynamically modified to integrate with a black box integration content having a black box source address and having a destination configuration as the destination system configuration. The modified integration content is integrated to the destination system through the generated black box integration content.

An aspect combinable with any of the other aspects includes the following features. To integrate the modified integration content to the destination system through the generated black box integration content, integration components of the deployed integration content are flowed to the black box integration content, and the integration components of the deployed integration content are flowed through the black box integration content to the destination system.

An aspect combinable with any of the other aspects includes the following features. To dynamically modify the integration content, the black box integration content is dynamically generated with the black box source address and the destination configuration as the destination system configuration. The destination configuration of the deployed integration content is changed to the black box source address.

An aspect combinable with any of the other aspects includes the following features. To dynamically generate the black box integration content, the black box integration content is generated to include a server component configured to accept requests for integration content, a client component configured to route integration content to the destination system, and a proxy filter configured to implement a network topology that translates the integration content received by the server component into the integration content that the client component routes to the destination system.

An aspect combinable with any of the other aspects includes the following features. To dynamically modify the integration content, a destination address of the deployed integration content is replaced with an address of the black box integration content.

An aspect combinable with any of the other aspects includes the following features. To dynamically generate the black box integration content, the black box integration content is generated using integration constructs included in integration content runtime.

An aspect combinable with any of the other aspects includes the following features. The integration constructs include a sender, a receiver, and protocol mapping required to route the integration content to the destination system.

An aspect combinable with any of the other aspects includes the following features. To dynamically generate the black box, a portion of the integration content is identified, and a protocol transformation of the identified portion of the integration content is implemented to dynamically generate the black box integration content.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
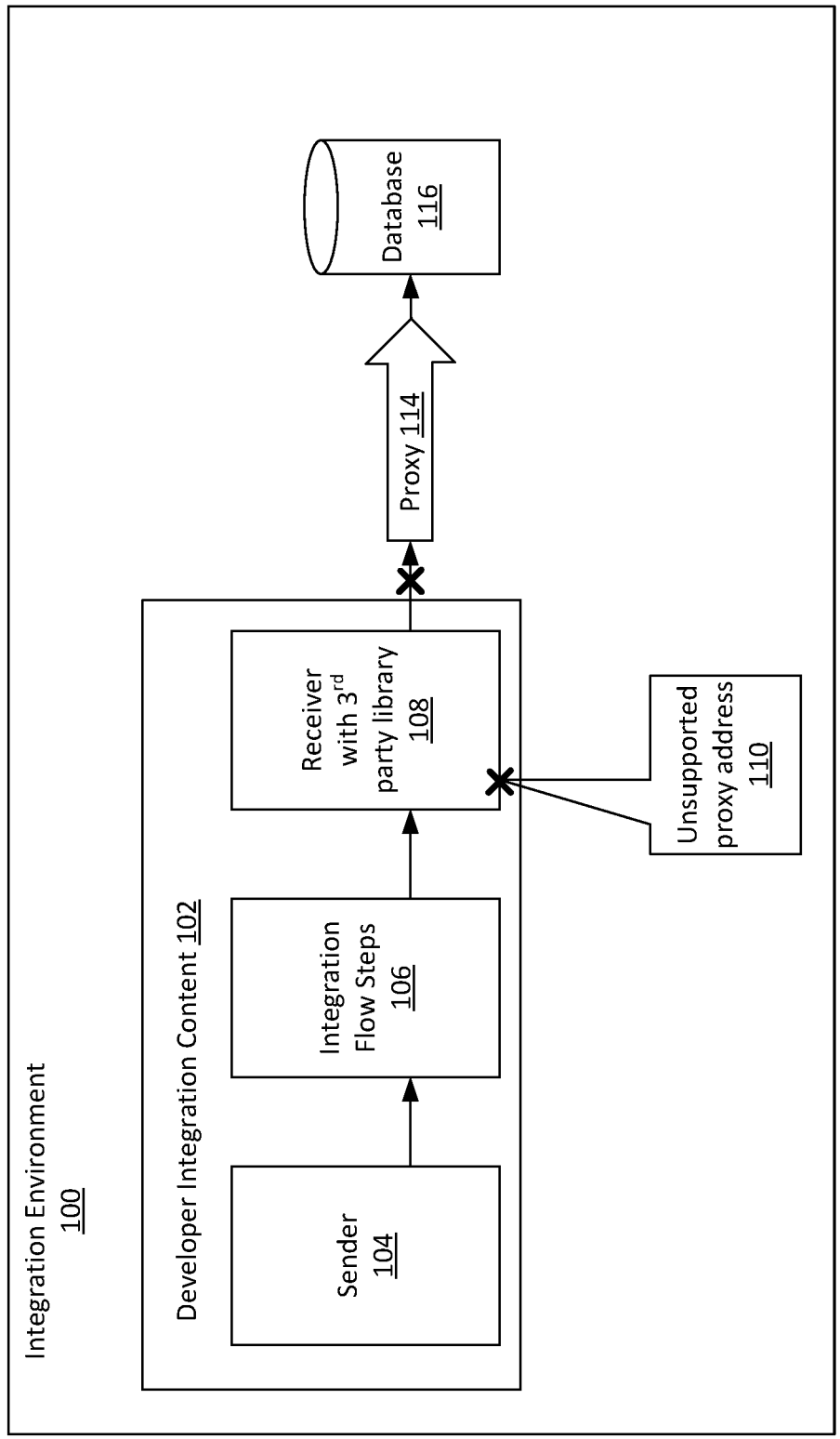
FIG. 1 is a schematic of an example of an integration environment implementing an integration flow of integration content.

A CPI (Cloud Platform Integration) component is a middleware layer that enables development of integration scenarios. An integration scenario can integrate two heterogeneous cloud (or other types of) applications. In some instances, different cloud applications may desire to communicate and send information to other, different cloud applications. Cloud applications may each understand and use different languages, such that a CPI middleware layer can enable communication between different cloud applications. The CPI middleware layer can be configured to perform an integration scenario between applications. The integration scenario can define steps to perform to transform data from a first language used by a first application to a second language used by a second application, for example. The CPI middleware layer can also perform other transformations, to put data from the first application in a form that is usable by the second application. In summary, the CPI middleware layer can integrate otherwise incompatible applications.

An integration environment (sometimes called an integration engine) defines a software environment used to establish and run business or software system integration scenarios. Apache Camel is an example of an integration environment in which the subject matter described in this application can be implemented. The subject matter described here can be implemented in other integration environments, as well. The integration content is a portion of the integration environment that defines one or more of the source, target, or transformations implemented within the integration environment. The destination system defines a software or hardware system with a destination system configuration, for example, a network address and port, which accepts network traffic. In an integration scenario, the destination system would be at the network receiving end of the integration flow (i.e., the connection of various integration environment components with each other). In general, the integration flow can be the connection of components as described in this disclosure. Alternatively or in addition, the integration flow can be an object that can be viewed, edited, saved, then later processed. A database server is an example of the destination system. A proxy routes the integration content to the destination system. The proxy defines a software/hardware networking component/layer that helps in routing network requests/traffic from one application layer/component to another. Socks Proxy is an example of a proxy. The subject matter described here can be implemented with other proxies, as well. A filter or proxy filter is a software component or a set of software components (or modules), which can be chained together to provide network protocol specific handling and negotiation to enable flow of traffic from a source to a destination via a proxy. In an integration space, the proxy filters can be chained using integration constructs of flow steps. An example chain of proxy filters can include Authenticator→Checksum Generator→Payload Transformer→Error Handler.

In an integration environment, existing integration content and third party libraries (which expect some standard protocols, configurations or mechanisms to connect) interface with a destination system. Direct and standard integration or connectivity to the destination system cannot be implemented, in some scenarios, due to network topology or system constraints of the destination system. That is, the destination configuration specified in the network topology of the integration content is incompatible with the destination system configuration. Integration is also not possible, moreover, if the third-party drivers are non-modifiable and do not allow enhancing the third-party code line or existing configuration mechanisms or do not allow such custom configuration requirements. This subject matter described in this disclosure describes techniques to integrate and consume custom and non-compatible proxies from third party libraries within an integration environment.

To do so, in some implementations described in this disclosure, the integration environment dynamically splits the integration content (i.e., the content having a destination address that is incompatible with the destination address of the destination system) into two separate integration contents—a modified integration content and a black box integration content. The modified integration content is similar to the original integration content, except that the destination address is replaced with a network server component address of the black box integration content. The black box integration content is a dynamically generated integration content that includes the following components—a network server component accepting requests from the modified integration content; a network client component responsible for forwarding the traffic from proxy filter to the destination address of the destination system; and a proxy filter responsible for implementing that translation and negotiation layer for connecting to the destination system via the network proxy/topology constraints.

Implementations of the subject matter described here overcome a scenario in which a non-compatible proxy is defined as a blocker that prevents the non-compatible proxy from being used in an integration from a third party component. The implementations avoid the need to change the source code of the third party library or require the manufacturer of the third party library to adapt and make compatible proxies in future releases. As described later, the black box component or other library is not imported into the environment. Rather, the integration environment itself implements a protocol transformation to implement the integration flow through the non-compatible proxy. Consequently, there is no software or version compatibility issue involved with importing additional libraries. The black box integration content generated by the protocol transformation is already available in the runtime, e.g., as a socket sender and receiver along with any protocol mapping that is required. The protocol transformation is reusable, its lifecycle management does not require special handling, and the protocol transformation can be managed and scaled as any other integration content. Implementing the subject matter described here provides support for all different types of network proxying requirements across different protocols and destination types, and can be integrated into any network based integration content (e.g., hypertext transfer protocol (HTTP), advanced message queueing protocol (AMQP), (remote function calls) RFC adapters, Java message service (JMS), Kafka), without requiring any changes to the adapter code line. All error handling and traceability can be monitored like any other integration content. Since the configuration of the original integration content is not landscape or deployment specific, the same integration content can be used on different landscapes. Each integration environment can dynamically generate the black box based on that particular landscape's requirements.

FIG. 1 is a schematic of an example of an integration environment 100 implementing an integration flow of integration content 102 via proxy 114. The integration environment 100 includes integration content 102 (called developer integration content or deployed integration content) that is to be integrated into a destination system (for example, database 116) having a destination system configuration. The integration content 102 includes a sender 104 that is the source of the integration content 102. The integration content includes the integration flow and other supporting assets, for example, passwords, configurations, third party drivers/libraries consumed by the integration flow and are configured externally to the integration flow. The integration flow steps 106 represents the portion of the integration content that establishes an operational mapping of the integration content 102 from the sender 104 to a receiver 108 with a third party library, for example, Java Database Connectivity (JDBC) library.

The intended destination of the integration content 102 is the database 116. However, the network topology or other destination system constraints may make standard and direct connectivity to the database 116 impossible. Alternatively or in addition, the source code of the third party library may not be modifiable to enable compatibility of the receiver 108 and the database 116. For example, the integration environment 100 routes the integration content 102 to the database 116 via the proxy 114, for example, socks proxy. However, the incompatibility may arise because the third party library of the receiver 108 has an unmodifiable proxy address 110 that cannot be modified to match that of the proxy 114. Alternatively, the network landscape may introduce certain limitations on the payload being transmitted, for example, a maximum packet size. But, the third party driver may be transmitting a packet with larger payload size. Consequently, the connection to the database 116 fails because the network topology requires the proxy 114 to be configured in the outgoing request, but the third party library in the receiver 108 does not permit such configuration.

Figure 2:
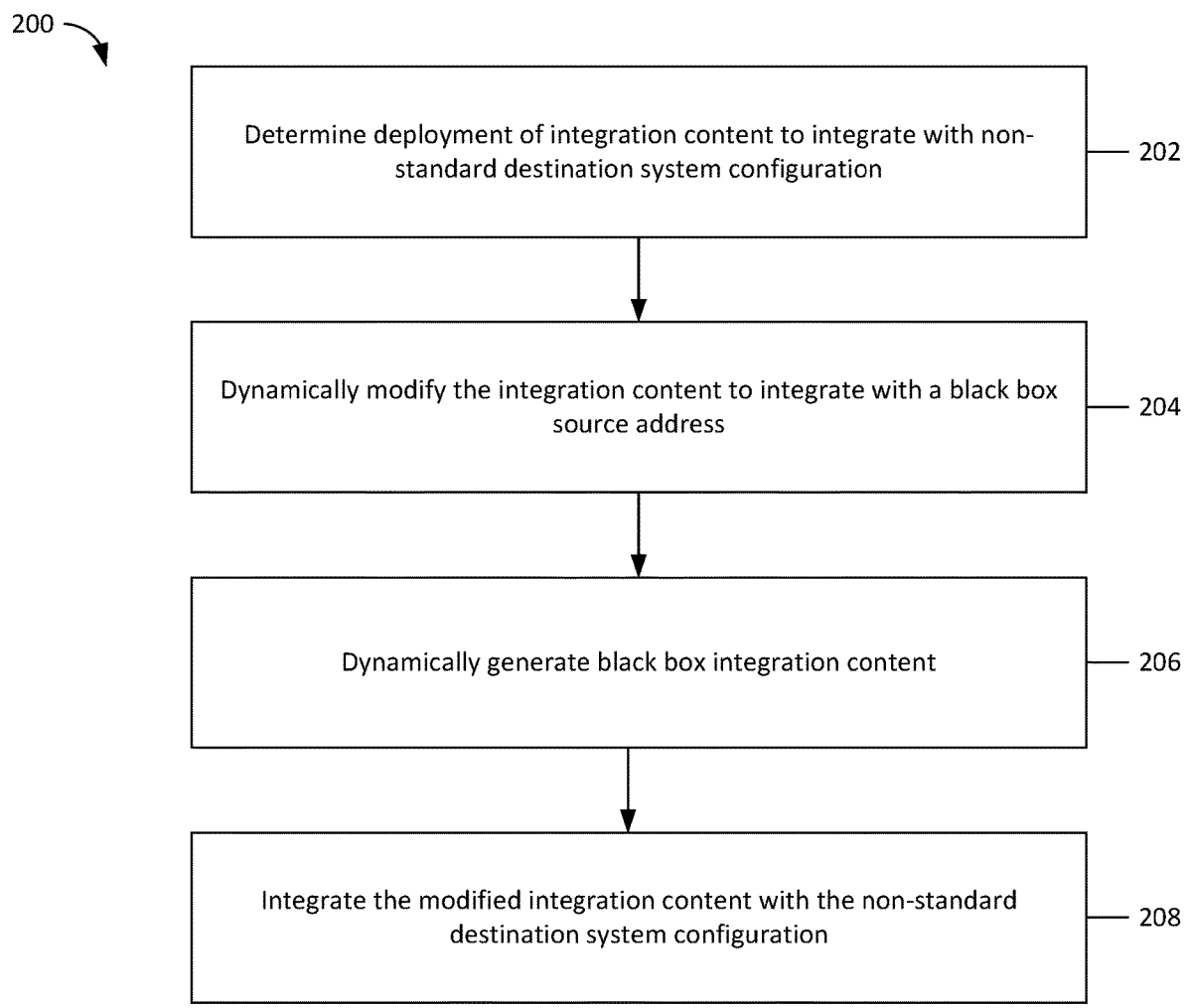
FIG. 2 is a flowchart of an example of a method to implement the integration flow.

FIG. 2 is a flowchart of an example of a method 200 to implement the integration flow via the proxy. The method can be implemented by the integration environment 100. At 202, the deployment of integration content to integrate with non-standard destination system configuration is determined. For example, the integration environment 100 determines that the developer has deployed integration content with a non-standard destination system and port. In the context of this application, "non-standard" means that either the integration content or a third party library included with the integration content does not support the proxy that routes the integration content to the destination system. Said differently, the destination configuration of the deployed integration content is incompatible with the destination system configuration of the database 116. In some examples, the destination configuration is incompatible or non-standard because the destination address may use an address which is internal only, for example, a virtual hostname, and is understandable by the proxy, but not resolvable by the domain name server (DNS). In such examples, the destination is not a valid Internet protocol (IP) address or a valid DNS hostname (i.e., incompatible or non-standard) and the driver/third party content will not be able to connect because the DNS resolution of the virtual hostname fails.

Figure 3:
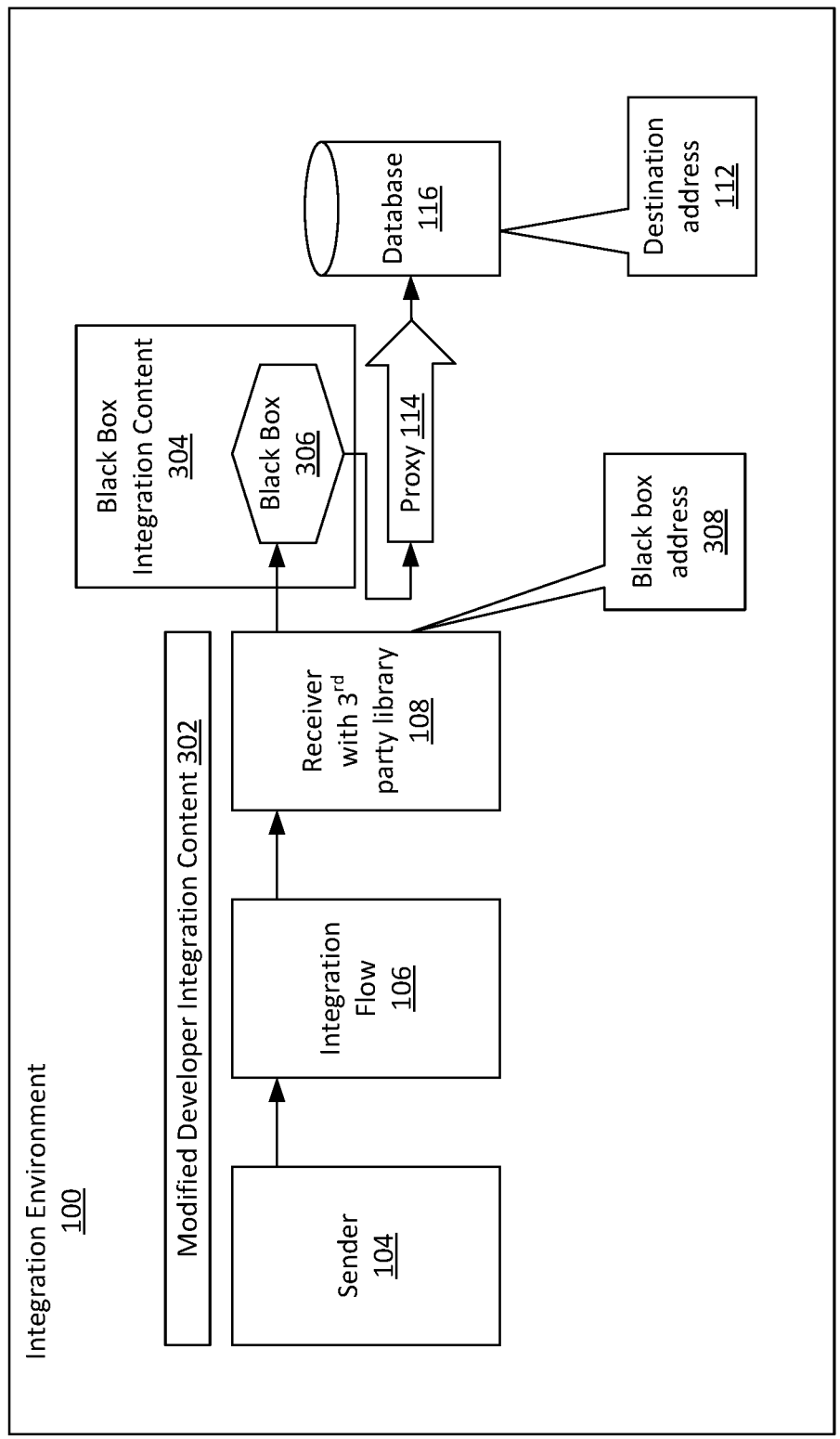
FIG. 3 is a schematic of an example of the integration environment of FIG. 1 in which the integration content has been split.

At 204 and in response to determining the deployment, the integration content is dynamically modified to integrate with a black box source address. To do so, the integration environment splits the integration content into two portions—a modified developer integration content, and a black box integration content. FIG. 3 is a schematic of an example of the integration environment 100 in which the integration content has been split.

The first modified integration content portion 302 includes all components of the developer integration content (or the deployed integration content), except that the integration environment 100 replaces the destination address with an address of the black box integration content 304. At 206, a black box integration content is dynamically generated. In some implementations, the black box integration content 304 shown in FIG. 3 is a dynamically generated integration content which includes the black box 306. In other words, in the modified integration content 302, the integration environment 100 replaces the destination address of the receiver 108 of the developer integration content 102 with the black box address 308. The replacement allows the black box 306 to receive the modified integration content 302 from the receiver 108. In some implementations, if a black box integration content already exists for the same combination of the destination system configuration 116 and the receiver 108, then the pre-existing black box integration content (which the integration environment 100 created in a prior instant) is reused and the black box sender address 402 is configured in the receiver 108.

Figure 4:
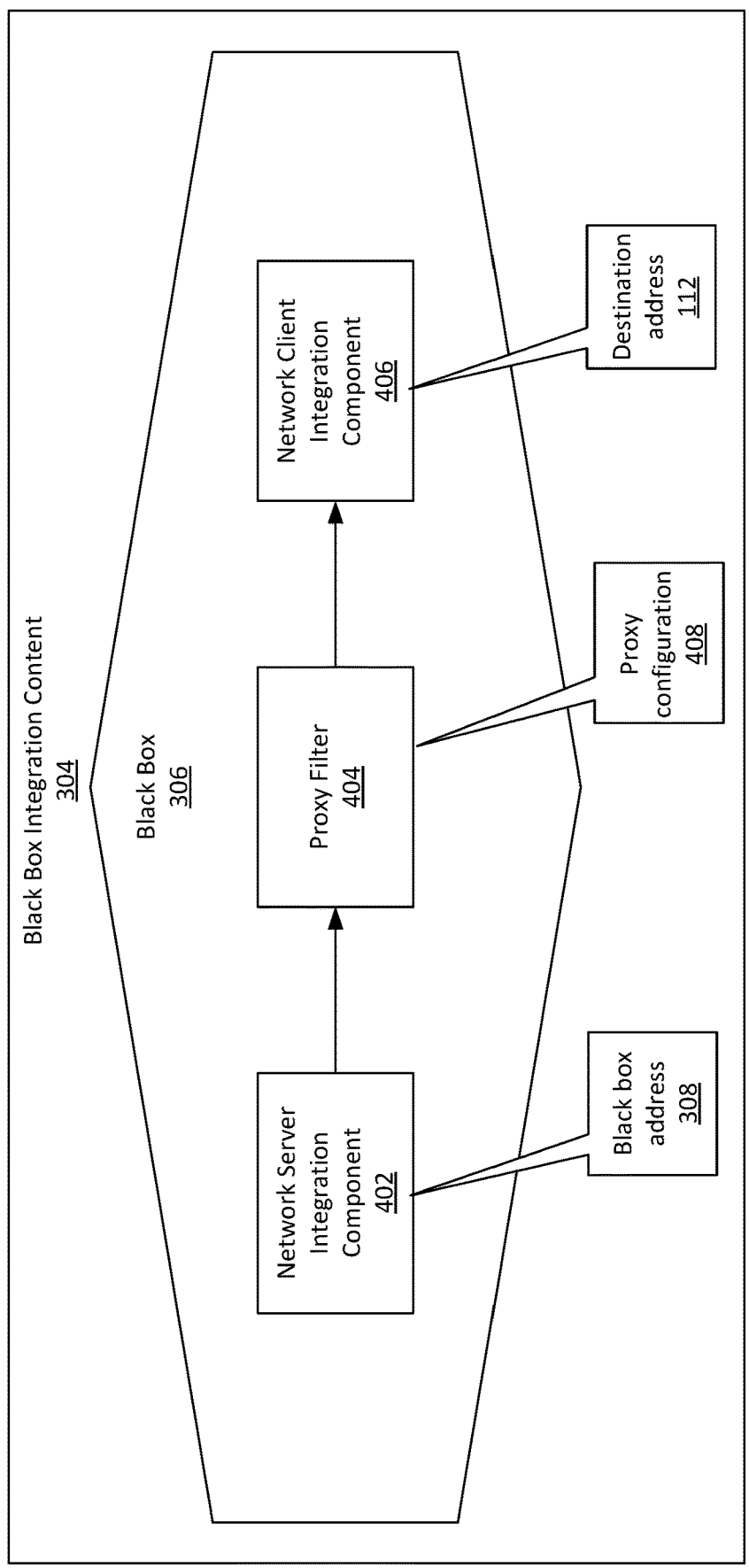
FIG. 4 is a schematic of an example of black box integration content.

FIG. 4 is a schematic of an example of a black box integration content 304. The following components are included in the black box integration content 304—a network server component 402 which accepts requests from the modified integration content 302; a network client component 406 that is responsible for forwarding the traffic from a proxy filter 404 to the destination address; and the proxy filter 404 that is responsible for implementing that translation and negotiation layer for connecting to the destination system (for example, the database 116) via the network proxy/topology constraints. The destination address of the network server integration component 402 is the black box address 308. The destination address of the network client integration component 406 is the destination address 112 of the database 116. The proxy configuration 408 has the configuration of the proxy 114. The proxy configuration 408 can alternatively be included in the network client integration component 406. In implementations in which the network landscape introduces certain limitations on the payload being transmitted (e.g., maximum packet size), the integration environment 100 can configure the black box 306 to further transform the payload and segment the packets into smaller chunks using the proxy filter 114 to do the same.

At 208, the modified integration content is integrated with the non-standard destination system configuration through the generated black box integration content. Because the destination address of the receiver of the modified integration content 302 has been replaced to be the black box destination address, the integration environment 100 transfers the integration content from the sender 104 to the network server integration component 402, which also has the black box address 308. The network server integration component 402 transfers the integration content through the proxy filter 404 that implements the translation and negotiation layer for connecting to the destination system (i.e., the database 116). The integration content is transferred to the network client integration component 406 that has the destination address of the database 116 and routes traffic to the destination via the proxy 114. The proxy 114 supports the modified integration content transfer to the database 116.

As described earlier, the black box integration content 304 is created using integration constructs already included in the integration content runtime, namely, a sender, a receiver and a protocol mapping. Integration constructs are modules provided out of the box by the integration environment. These modules are used to construct the integration flow. Examples of constructs include senders (e.g., HTTP server, FTP poller (read), SMTP mail poller (read), TCP network server), receivers (e.g., HTTP client, FTP client (write), SMTP client (write), TCP network client) and flow steps (e.g., XML to JSON converter, content modifier, content router). The protocol mapping refers to the requisites mandated by the proxy or the destination. The protocol mapping can include, for example, special authentication required by the proxy before actual traffic can be passed onto the destination system, the addition of some special headers or checksum to the payload being transferred, encoding/decoding of special characters using some mechanism (such as Base64), special error handling of errors caused by the proxy which are outside the purview of the original integration content or payload, or any combination of them. To do so, the integration environment 100 identifies a portion of the integration content and implements a protocol transformation of the identified portion to dynamically create the black box integration content 304. The logic to do so is encoded into the integration environment 100. The logic determines the current environment/landscape in which the integration environment 100 runs. Based on the environment, the black box content can differ. The integration environment 100 includes a component which monitors the integration content being deployed into the environment. The moment that a destination of interest is detected (e.g., JDBC data-source), the configuration of the destination/receiver component is introspected to identify if the destination is directly reachable or requires special network handling based on the current network topology of the current integration environment. Based on the receiver type, destination and configuration set in the destination/receiver, the logic checks its catalogue for the integration components required. The logic also checks and maintains a registry of used ports/addresses for the network server integration component 402, which ensures that, for a new destination, a different port is used for the network server integration component 402 for the black box associated with the new destination. In the foregoing description, "logic" can be implemented as computer instructions stored on a computer-readable medium and executable by a computer system.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

In view of the above-described implementations of subject matter this application discloses the following list of examples, wherein one feature of an example in isolation or more than one feature of said example taken in combination and, optionally, in combination with one or more further examples are further examples also falling within the disclosure of this application:

Example 1. A computer-implemented method comprising determining deployment of integration content to integrate with a destination system having a destination system configuration, wherein the integration content has a destination configuration that is incompatible with the destination system configuration; and in response to determining that the integration content has the destination configuration that is incompatible with the destination system configuration: dynamically modifying the integration content to integrate with a black box integration content having a black box source address and having a destination configuration as the destination system configuration, and integrating the modified integration content to the destination system through the generated black box integration content.

Example 2. The method of Example 1, wherein integrating the modified integration content to the destination system through the generated black box integration content comprises: flowing integration components of the deployed integration content to the black box integration content; and flowing the integration components of the deployed integration content through the black box integration content to the destination system.

Example 3. The method of Examples 1 or 2, wherein dynamically modifying the integration content comprises: dynamically generating the black box integration content with the black box source address and the destination configuration as the destination system configuration; and changing the destination configuration of the deployed integration content to the black box source address.

Example 4. The method of any one or more of Examples 1, 2 or 3, wherein dynamically generating the black box integration content comprises generating the black box integration content comprising a server component configured to accept requests for integration content, a client component configured to route integration content to the destination system, and a proxy filter configured to implement a network topology that translates the integration content received by the server component into the integration content that the client component routes to the destination system.

Example 5. The method of any one or more of Examples 1-4, wherein dynamically modifying the integration content comprises replacing a destination address of the deployed integration content with an address of the black box integration content.

Example 6. The method of any one or more of Examples 1-5, wherein dynamically generating the black box comprises generating the black box integration content using integration constructs included in integration content runtime.

Example 7. The method of any one or more of Examples 1-6, wherein the integration constructs comprise a sender, a receiver, and protocol mapping required to route the integration content to the destination system.

Example 8. The method of any one or more of Examples 1-7, wherein dynamically generating the black box comprises: identifying a portion of the integration content; and implementing a protocol transformation of the identified portion of the integration content to dynamically generate the black box.

The invention claimed is:

1. A computer-implemented method comprising:
   determining deployment of integration content to integrate with a destination system having a destination system configuration, wherein the integration content has a destination configuration that is incompatible with the destination system configuration; and
   in response to determining that the integration content has the destination configuration that is incompatible with the destination system configuration:
      dynamically modifying the integration content to integrate with a black box integration content having a black box source address and having a destination configuration as the destination system configuration, and integrating the modified integration content to the destination system through the generated black box integration content, wherein dynamically modifying the integration content comprises:

dynamically generating the black box integration content with the black box source address and the destination configuration as the destination system configuration; and changing the destination configuration of the deployed integration content to the black box source address, wherein dynamically generating the black box integration content comprises generating the black box integration content comprising a server component configured to accept requests for integration content, a client component configured to route integration content to the destination system, and a proxy filter configured to implement a network topology that translates the integration content received by the server component into the integration content that the client component routes to the destination system, wherein dynamically modifying the integration content comprises replacing a destination address of the deployed integration content with an address of the black box integration content.

2. The method of claim 1, wherein integrating the modified integration content to the destination system through the generated black box integration content comprises:

flowing integration components of the deployed integration content to the black box integration content; and flowing the integration components of the deployed integration content through the black box integration content to the destination system.

3. The method of claim 1, wherein dynamically modifying the integration content comprises:

dynamically generating the black box integration content with the black box source address and the destination configuration as the destination system configuration; and changing the destination configuration of the deployed integration content to the black box source address.

4. The method of claim 3, wherein dynamically generating the black box integration content comprises generating the black box integration content comprising a server component configured to accept requests for integration content, a client component configured to route integration content to the destination system, and a proxy filter configured to implement a network topology that translates the integration content received by the server component into the integration content that the client component routes to the destination system.

5. The method of claim 3, wherein dynamically generating the black box comprises generating the black box integration content using integration constructs included in integration content runtime.

6. The method of claim 5, wherein the integration constructs comprise a sender, a receiver, and protocol mapping required to route the integration content to the destination system.

7. The method of claim 3, wherein dynamically generating the black box integration content comprises:

identifying a portion of the integration content; and implementing a protocol transformation of the identified portion of the integration content to dynamically generate the black box integration content.

8. A system comprising:
one or more computers; and
a computer-readable medium coupled to the one or more computers having instructions stored thereon which, when executed by the one or more computers, cause the one or more computers to perform operations comprising:

determining deployment of integration content to integrate with a destination system having a destination system configuration, wherein the integration content has a destination configuration that is incompatible with the destination system configuration; and in response to determining that the integration content has the destination configuration that is incompatible with the destination system configuration:

dynamically modifying the integration content to integrate with a black box integration content having a black box source address and having a destination configuration as the destination system configuration, and integrating the modified integration content to the destination system through the generated black box integration content wherein dynamically modifying the integration content comprises:

dynamically generating the black box integration content with the black box source address and the destination configuration as the destination system configuration; and changing the destination configuration of the deployed integration content to the black box source address, wherein dynamically generating the black box integration content comprises generating the black box integration content comprising a server component configured to accept requests for integration content, a client component configured to route integration content to the destination system, and a proxy filter configured to implement a network topology that translates the integration content received by the server component into the integration content that the client component routes to the destination system, wherein dynamically modifying the integration content comprises replacing a destination address of the deployed integration content with an address of the black box integration content.

9. The system of claim 8, wherein integrating the modified integration content to the destination system through the generated black box integration content comprises:

flowing integration components of the deployed integration content to the black box integration content; and flowing the integration components of the deployed integration content through the black box integration content to the destination system.

10. The system of claim 8, wherein dynamically generating the black box integration content comprises generating the black box integration content using integration constructs included in integration content runtime.

11. The system of claim 10, wherein the integration constructs comprise a sender, a receiver, and protocol mapping required to route the integration content to the destination system.

12. The system of claim 8, wherein dynamically generating the black box integration content comprises: identifying a portion of the integration content; and implementing a protocol transformation of the identified portion of the integration content to dynamically generate the black box integration content.

13. A computer program product encoded on a non-transitory storage medium, the product comprising non-transitory, computer readable instructions for causing one or more processors to perform operations comprising:

determining deployment of integration content to integrate with a destination system having a destination system configuration, wherein the integration content has a destination configuration that is incompatible with the destination system configuration; and in response to determining that the integration content has the destination configuration that is incompatible with the destination system configuration:

dynamically modifying the integration content to integrate with a black box integration content having a black box source address and having a destination configuration as the destination system configuration, and integrating the modified integration content to the destination system through the generated black box integration content wherein integrating the modified integration content to the destination system through the generated black box integration content comprises:

flowing integration components of the deployed integration content to the black box integration content and flowing the integration components of the deployed integration content through the black box integration content to the destination system, and wherein dynamically modifying the integration content comprises:

dynamically generating the black box integration content with the black box source address and the destination configuration as the destination system configuration; and changing the destination configuration of the deployed integration content to the black box source address, wherein dynamically generating the black box integration content comprises generating the black box integration content comprising a server component configured to accept requests for integration content, a client component configured to route integration content to the destination system, and a proxy filter configured to implement a network topology that translates the integration content received by the server component into the integration content that the client component routes to the destination system, and wherein dynamically modifying the integration content comprises replacing a destination address of the deployed integration content with an address of the black box integration content.

14. The computer program product of claim 7, wherein dynamically generating the black box integration content comprises generating the black box integration content using integration constructs included in integration content runtime, wherein the integration constructs comprise a sender, a receiver, and protocol mapping required to route the integration content to the destination system, wherein dynamically generating the black box comprises: identifying a portion of the integration content; and implementing a protocol transformation of the identified portion of the integration content to dynamically generate the black box integration content.

* * * * *